US012497811B2

(12) United States Patent
Price

(10) Patent No.: US 12,497,811 B2
(45) Date of Patent: Dec. 16, 2025

(54) DOOR HINGE CUSHIONING ARRANGEMENT

(71) Applicant: Caterpillar Inc., Peoria, IL (US)

(72) Inventor: M. Shane Price, Durham, NC (US)

(73) Assignee: Caterpillar Inc., Peoria, IL (US)

( * ) Notice: Subject to any disclaimer, the term of this patent is extended or adjusted under 35 U.S.C. 154(b) by 130 days.

(21) Appl. No.: 18/527,217

(22) Filed: Dec. 1, 2023

(65) Prior Publication Data

US 2025/0179852 A1 Jun. 5, 2025

(51) Int. Cl.
*E05D 13/00* (2006.01)
*E05D 3/02* (2006.01)
*E05D 11/06* (2006.01)

(52) U.S. Cl.
CPC ............... *E05D 13/00* (2013.01); *E05D 3/02* (2013.01); *E05D 11/06* (2013.01)

(58) Field of Classification Search
CPC ........... E05D 13/00; E05D 3/02; E05D 11/06; E05D 2011/1035; E05D 2011/1078; E05Y 2201/638; Y10T 3/32827; Y10T 3/32836
See application file for complete search history.

(56) References Cited

U.S. PATENT DOCUMENTS 3,436,069 A * 4/1969 Henschen ............ B60G 11/225 464/83
3,591,216 A * 7/1971 Onufer ................ F16B 19/1081 24/664
3,754,543 A * 8/1973 Harkness .................. F02N 3/02 123/185.3
4,722,502 A * 2/1988 Mueller ............. F16M 11/2021 362/427
6,886,221 B2 * 5/2005 Minami .............. H04M 1/0216 361/679.01
7,007,345 B2 * 3/2006 Nakase ................. G06F 1/1681 16/326
7,120,967 B2 * 10/2006 Johnson .................. E05D 7/081 16/342
7,373,692 B2 * 5/2008 Kfoury ................... E05D 15/00 16/334
7,607,201 B2 * 10/2009 Lin ....................... G06F 1/1616 16/334
7,631,397 B2 * 12/2009 Yin ....................... G06F 1/1681 16/337

(Continued)

FOREIGN PATENT DOCUMENTS

CN 2698940 Y * 5/2005
CN 213742834 U 7/2021

(Continued)

OTHER PUBLICATIONS

European Search Report for EP Patent Appln. No. 24211936.0, mailed Apr. 8, 2025 (8 pgs).

*Primary Examiner* — Jason W San
*Assistant Examiner* — Matthew J Sullivan

(57) ABSTRACT

A hinge is disclosed for pivotably coupling a first structure to a second structure. The hinge includes a driving member, a driven member, and an elastomeric bushing disposed along a central axis. The driving member is configured for coupling to the first structure. The elastomeric bushing is disposed between the driving member and the driven member to cushion engagement of the driving member with the driven member.

18 Claims, 6 Drawing Sheets

(56) References Cited

U.S. PATENT DOCUMENTS 7,814,620 B2 * 10/2010 Lin .................... H04M 1/0216
16/284
7,954,203 B2 * 6/2011 Chen .................. H04M 1/0212
16/374
8,066,320 B1 * 11/2011 Grabowski ........... E05F 1/1223
16/334
8,813,313 B2 * 8/2014 Freitas Marinho ... E05F 1/1223
16/378
9,016,773 B2 * 4/2015 Tanner .................... E05D 11/10
296/193.11
9,739,523 B1 * 8/2017 Augsburger .............. E05D 3/02
11,002,055 B2 * 5/2021 Eickhoff ................. E05F 3/227
11,898,397 B2 * 2/2024 Lygin ........................ E05F 1/10
12,139,951 B2 * 11/2024 Lehti ....................... E05D 11/06
2002/0112319 A1 * 8/2002 Kida ..................... G06F 1/1616
16/342
2007/0119022 A1 5/2007 Tomizawa
2009/0007379 A1 1/2009 Zhang et al.
2009/0058131 A1 * 3/2009 Smith .................... B62D 33/03
296/146.11
2015/0167275 A1 6/2015 Ogden et al.
2015/0345203 A1 * 12/2015 Vanini ....................... E05F 3/20
16/68
2021/0025130 A1 1/2021 Kato
2021/0164277 A1 * 6/2021 Alonzi ................ E05D 11/1057
2025/0003464 A1 * 1/2025 Hewett .................... B60K 1/00

FOREIGN PATENT DOCUMENTS

KR 10-1618052 B1 5/2016
WO WO-2018080134 A1 * 5/2018 .............. F16F 9/145
WO WO-2023121645 A1 * 6/2023 ............. E05D 7/121

* cited by examiner

DOOR HINGE CUSHIONING ARRANGEMENT

TECHNICAL FIELD

This patent disclosure relates generally to hinges that couple doors to vehicles and, more particularly to a method and system for cushioning the stops of a hinge assembly coupling a door to a vehicle.

BACKGROUND

A door hinge assembly with a hard stop in the hinge mechanism at the open position of the door can cause damage to the door or to the hinge assembly when stopping the inertia of the moving door. The problem is particularly aggravated with vehicles, which often have one or more very heavy doors coupled to a cab. Accordingly, heavy doors may present a challenge for an operator to control the momentum of the door as it moves to the open position, for example. Damaged doors or hinge assembly may require downtime to repair, removing a vehicle from operation for a time. In an attempt to address this challenge, U.S. Patent Publication No. 2021/0025130 A1 to Kato provides an arrangement wherein a gas spring biases the door in the closing direction and position in order to avoid potential damage.

SUMMARY

According to an aspect of this disclosure, there is provided a hinge for pivotably coupling a first structure to a second structure. The hinge includes a driving member, a driven member, and an elastomeric bushing disposed along a central axis. The driving member is configured for coupling to the first structure. The elastomeric bushing is disposed between the driving member and the driven member to cushion engagement of the driving member with the driven member.

According to another aspect of this disclosure, there is provided a hinge assembly configured for pivotably coupling a door to a vehicle. The hinge assembly includes a driving member, a first cam, a second cam, and an elastomeric bushing. The driving portion is configured to be coupled to the door, and the second cam is configured to be coupled to the vehicle. The driving portion is configured for rotation about a central axis, and includes a plurality of driving protrusions that extend in a direction parallel to the central axis. The first cam includes a first cam upper side and a first cam lower side. The first cam lower side includes a plurality of arcuately-shaped lower protrusions having ramped lower surfaces and first cam stops. The first cam upper side defines a plurality of recesses extending within the plurality of arcuately-shaped lower protrusions, the plurality of recesses including a plurality of substantially radially extending walls. The second cam includes a second cam upper side and a second cam lower side. The second cam upper side includes a plurality of arcuately-shaped upper protrusions having ramped upper surfaces and second cam stops. The second cam is configured to be coupled to the vehicle. The first cam and the second cam are disposed along the central axis so that the ramped lower surfaces of the plurality of arcuately-shaped lower protrusions are configured to ride along the ramped upper surfaces of the plurality of arcuately-shaped upper protrusions as the first cam is driven to rotate relative to the second cam about the axis. The elastomeric bushing is disposed between the driving member and the first cam. The elastomeric bushing includes an interrupted disk from which a plurality of lobes extend in a direction parallel to the central axis. At least a portion of the plurality of lobes is separated by a plurality of interruptions in the disk. The plurality of lobes of the elastomeric bushing extends in a generally radial direction parallel to the central axis. The plurality of lobes of the elastomeric bushing are disposed extending into at least a portion of the plurality of recesses of the first cam and into at least a portion of the recesses of the plurality of arcuately-shaped lower protrusions of the first cam. The driving protrusions of the driving member extend through the plurality of interruptions in the elastomeric bushing and into the plurality of recesses of the first cam and into at least a portion of the plurality of arcuately-shaped lower protrusions of the first cam. In this way, the plurality of lobes is disposed between the driving protrusions and the plurality of substantially radially extending walls of the recesses of the arcuately-shaped lower protrusions of the first cam.

According to yet another aspect of this disclosure, there is provided a vehicle including a vehicle body, a door, and a hinge assembly coupling the door to the vehicle body. The hinge assembly includes a driving member coupled for rotation with the door, a first cam, a second cam coupled with the vehicle body, and an elastomeric bushing. The driving member is configured for rotation about a central axis as the door is opened and closed. The driving member includes a plurality of driving protrusions that extend in a direction parallel to the central axis. The first cam includes a first cam upper side and a first cam lower side. The first cam lower side includes a plurality of arcuately-shaped lower protrusions having ramped lower surfaces and first cam stops. The first cam upper side defines a plurality of recesses extending within the plurality of arcuately-shaped lower protrusions. The plurality of recesses include a plurality of substantially radially extending walls. The second cam includes a second cam upper side and a second cam lower side. The second cam upper side includes a plurality of arcuately-shaped upper protrusions having ramped upper surfaces and second cam stops. The first cam and the second cam are disposed along the central axis so that the ramped lower surfaces of the plurality of arcuately-shaped lower protrusions are configured to ride along the ramped upper surfaces of the plurality of arcuately-shaped upper protrusions as the first cam is driven to rotate relative to the second cam about the central axis. The elastomeric bushing is disposed between the driving member and the first cam. The elastomeric bushing includes an interrupted disk from which a plurality of lobes extend in a generally radial direction parallel to the central axis. The plurality of lobes are separated by a plurality of interruptions in the disk. The plurality of lobes are disposed within at least a portion of at least one of the plurality of recesses of the arcuately-shaped lower protrusions of the first cam. The driving protrusions of the driving member extend through the plurality of interruptions in the elastomeric bushing and into the plurality of recesses of the arcuately-shaped lower protrusions of the first cam such that the plurality of lobes are disposed between the driving protrusions and plurality of substantially radially extending walls of the recesses of the arcuately-shaped lower protrusions of the first cam. In this way, the plurality of lobes cushions the engagement of the driving protrusions with the substantially radially extending walls of the recesses of the first cam when the driving member is rotated in a driving direction.

DETAILED DESCRIPTION

Figure 1:
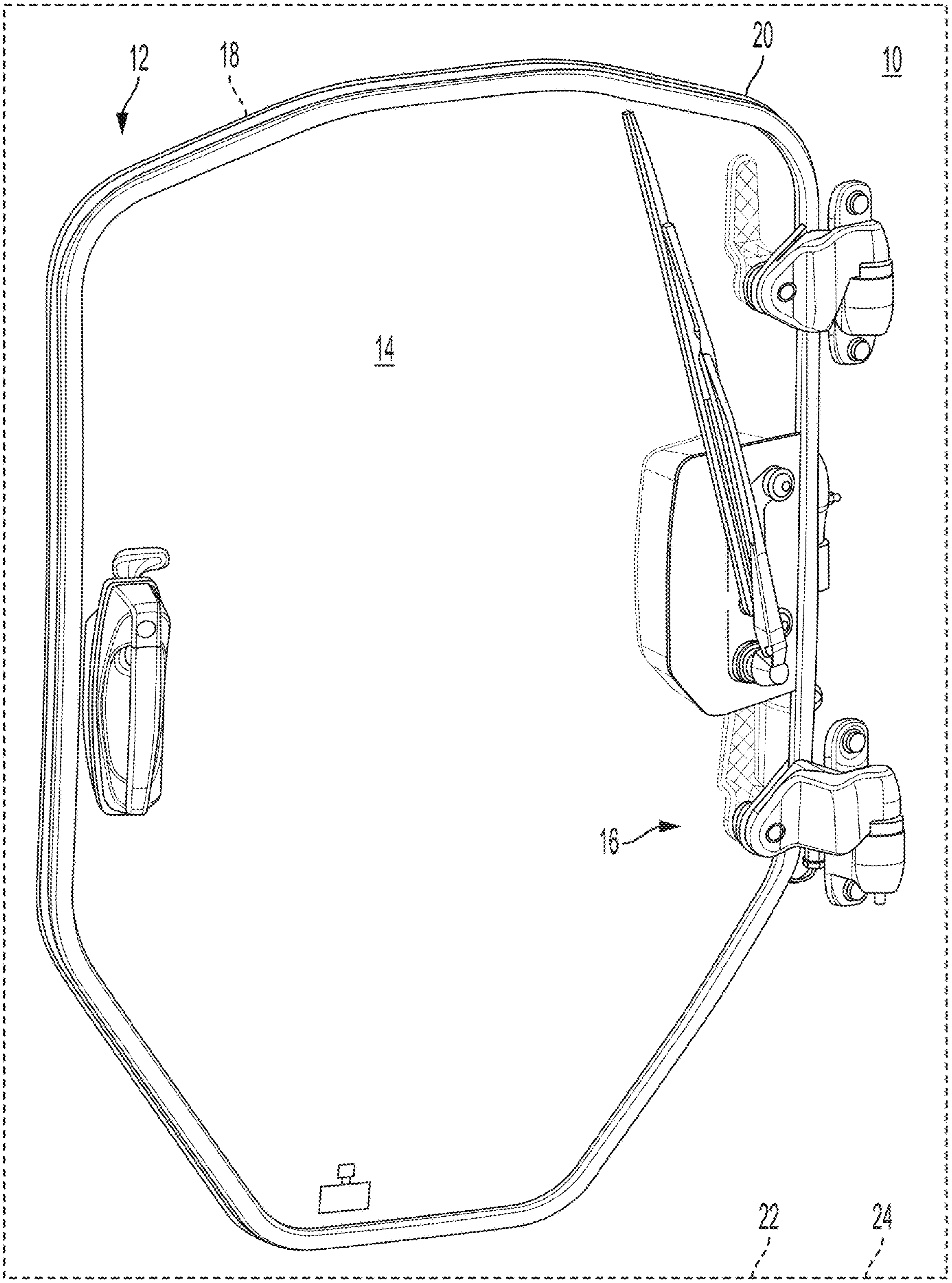
FIG. 1 is a schematic isometric view of a vehicle shown schematically including a door with a hinge assembly according to teachings of this disclosure.

Referring to FIG. 1, this disclosure relates to vehicles 10 (an exemplary vehicle being shown schematically in FIG. 1) that include an operator's station or cab 12 having at least one door 14 that is hinged to the vehicle 10 by at least one hinge assembly 16 according to teachings of this disclosure to open or cover an opening 18 to the cab 12, the opening 18 being surrounded by a doorframe 20. While the vehicle 10 itself is not illustrated in detail, the disclosed system and method may be utilized with any machine or vehicle 10 that may perform an action on a surrounding environment. By way of example only, the vehicle 10 itself may be a truck, a backhoe loader, a dozer, an excavator, a motor grader, a wheel loader, a skid steer loader, a soil compactor, or a tractor. The vehicle 10 may include a frame 22 supported on a plurality of traction devices 24, such as wheels or belts. The operator station or cab 12 or the like may be disposed on the frame 12.

Figure 2:
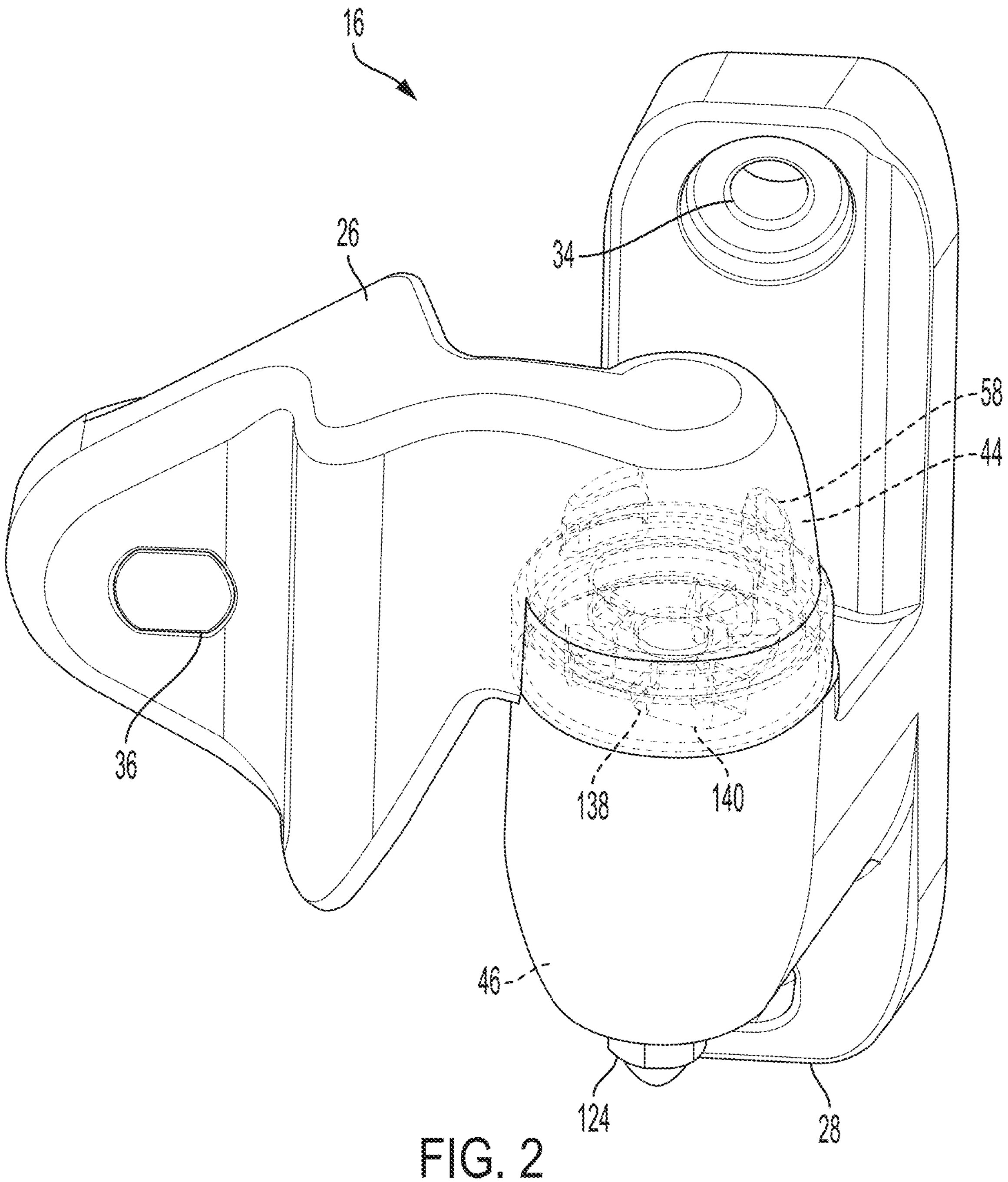
FIG. 2 is an enlarged schematic isometric view of the door hinge assembly of FIG. 1 illustrating certain of the internal components in phantom.
Figure 3:
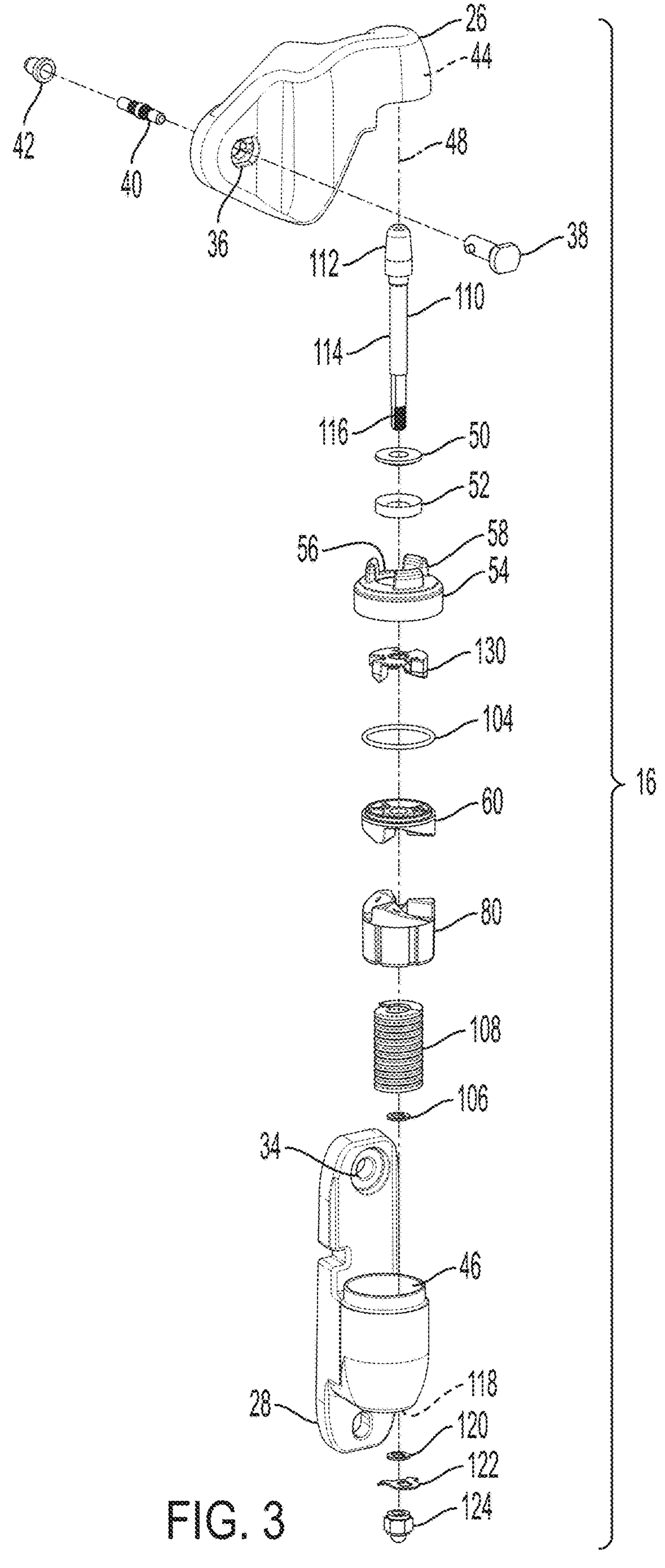
FIG. 3 is an exploded isometric schematic of the door hinge assembly of FIGS. 1 and 2.

While the door 14 may be hingedly coupled to the operator station 12 by any appropriate number of hinges, the illustrated embodiment includes two such hinge assemblies 16 to open or cover the doorframe 20 and opening 18. An enlarged view of one such hinge assembly 16 according to teachings of this disclosure is illustrated in FIG. 2 with a portion of the internal components of the hinge assembly 16 shown in phantom, and in FIG. 3, which provides an exploded view of the hinge assembly 16.

The hinge assembly 16 includes a top leaf 26 and a hinge base 28. In this embodiment, the top leaf 26 may be coupled to the door 14, while the hinge base 28 may be coupled to the vehicle 10, pivotably coupling the door 14 to cover the doorframe 20. It will be appreciated, however, that the top leaf 26 could be coupled to the vehicle 10 and the hinge base 28 coupled to the door 14.

Any appropriate coupling arrangement or arrangements may be provided to couple the hinge assembly 16 to the door 14 and the vehicle 10. In the illustrated embodiment, the hinge base 28 includes a plurality of bores 34 through which screws, bolts, rivets, or the like (not illustrated) may be inserted to couple the hinge base 28 to the vehicle 10. The top leaf 26 likewise may include one or more bores 36 through which a screw, bolt, rivet or the like may be inserted to couple the top leaf 26 to the door 14. In the illustrated embodiment, however, an arrangement for allowing the door 14 to be quickly removed in an emergency situation is provided. That is, an emergency handle pin 38 extending from the outside of the door 14 may be may be engaged with a locking pin 40 and bushing 42 on the inside of the door 14.

The top leaf 26 and the hinge base 28 each have an internal chamber 44, 46 in which internal components of the hinge assembly 16 are disposed along an axis 48. While a number of the components within the hinge assembly 16 may vary, the illustrated embodiment includes a top thrust bearing 50, a bottom thrust bearing 52 and a cap 54.

The cap 54 includes an upper channel 56 bordered by a plurality of arcuate engagement flanges 58, the top thrust bearing 50 and bottom thrust bearing 52 being disposed within the upper channel 56. The cap 54 further includes a lower surface from which a plurality of driving protrusions 59 extend. The engagement flanges 58 engage with internal structures (not visible in illustration) within the internal chamber 44 of the top leaf 26 such that the cap 54 rotates as the top leaf 26 rotates with the door 14.

The hinge assembly 16 further includes a top or first cam 60 and a bottom or second cam 80 disposed along the axis 48. An O-ring 104 may be disposed between the first cam 60 and the cap 54. A washer 106 and a cam spring 108 are likewise disposed along the axis 48 such that the cam spring 108 biases the second cam 80 toward the first cam 60.

Figure 4:
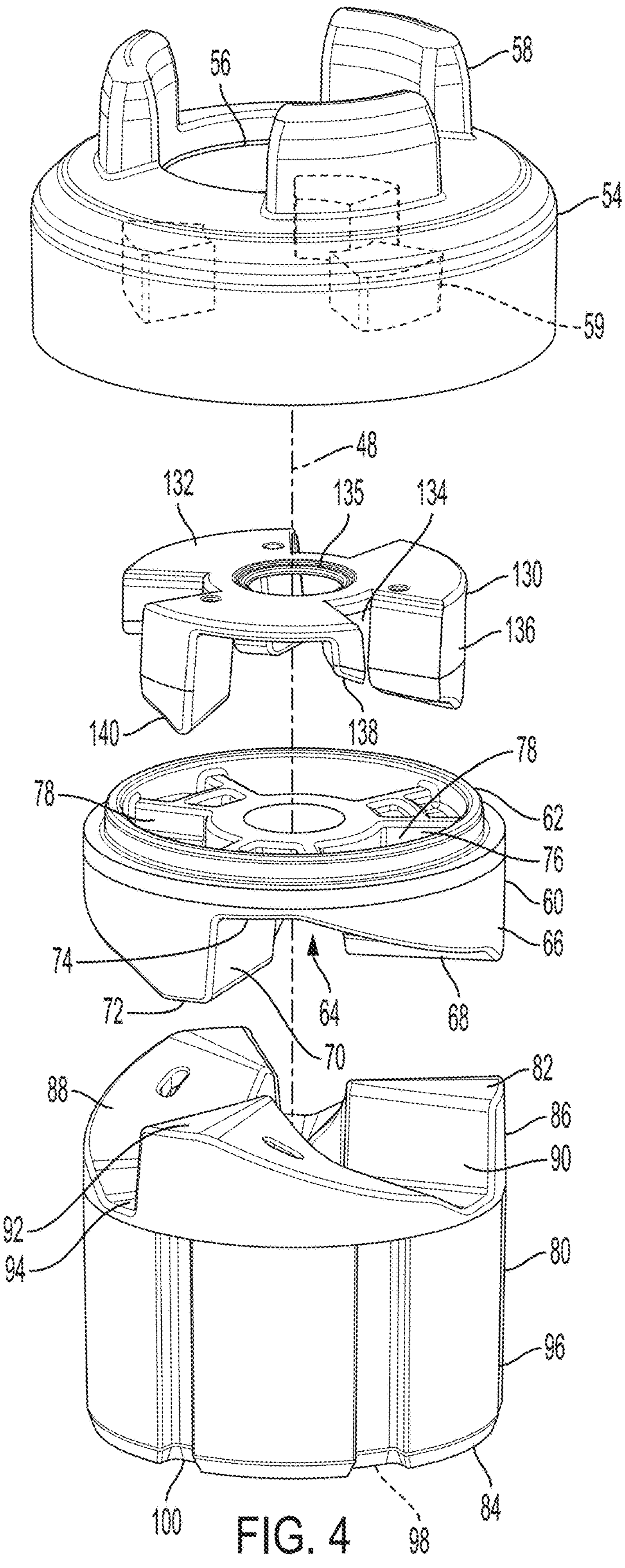
FIG. 4 is an enlarged fragmentary isometric view of the door hinge of FIGS. 1-3.
Figure 5:
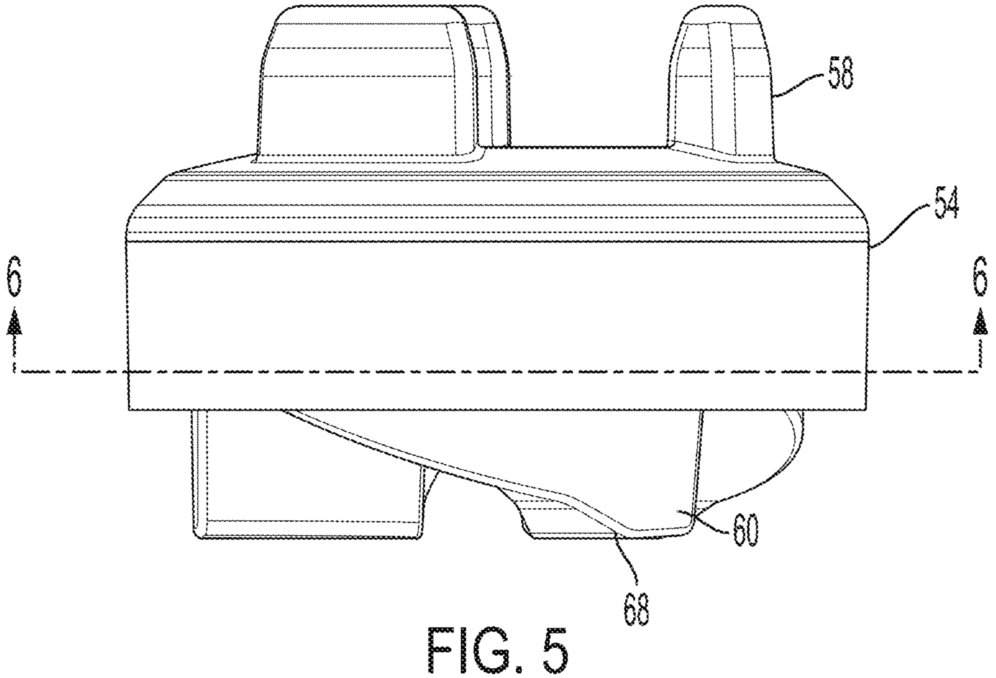
FIG. 5 is an enlarged fragmentary side elevational view of cap and top cam of the door hinge of FIGS. 1-4.
Figure 6:
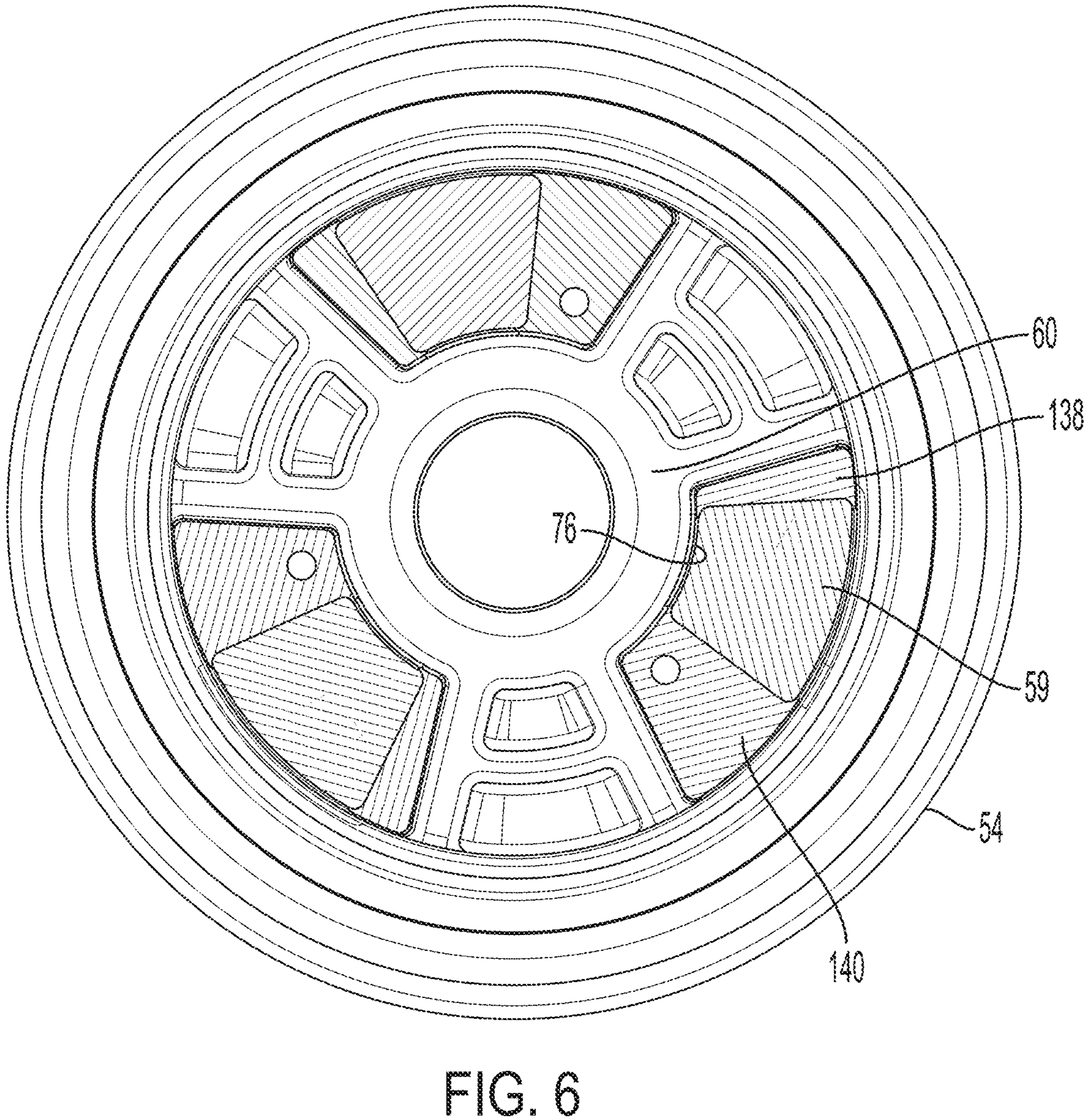
FIG. 6 is an enlarged cross-sectional view taken along the line 6-6 in FIG. 5.

Referring to FIG. 4, the first cam 60 has a first cam upper side 62 and a first cam lower side 64. The first cam lower side 62 includes a plurality of arcuately-shaped lower protrusions 66 having ramped lower surfaces 68 and first cam stops 70. While the arcuately-shaped lower protrusions 66 may be of any appropriate design, in at least one embodiment, the first cam stops 70 are longitudinally extending, disposed parallel to the axis 48. In at least one embodiment, the arcuately-shaped lower protrusions 66 present have substantially flat lower surfaces 72. In at least one embodiment, the arcuately-shaped lower protrusions 66 are spaced from one another by a plurality of first cam gaps 74. A plurality of recesses 76 extend from the first cam upper side 62 into the plurality of arcuately-shaped lower protrusions 66, the plurality of recesses 76 including a plurality of substantially radially extending walls 78. Rotation of the cap 54 with the top leaf 26 and the door 14 is transmitted to the top or first cam 60 as the driving protrusion 59 engage with the plurality of recesses 76 in the first cam upper side 62.

The second cam 80 has a second cam upper side 82 and a second cam lower side 84. The second cam upper side 82 includes a plurality of arcuately-shaped upper protrusions 86 having ramped upper surfaces 88 and second cam stops 90. The arcuately-shaped upper protrusions 86 are the same in number and are spaced to correspond to the arcuately-shaped lower protrusion 66 of the first cam 60 such that the ramped lower surfaces 68 of the first cam 60 ride along the ramped upper surfaces 88 of the second cam 80. As with arcuately-shaped lower protrusions 66 of the first cam 60, the arcuately-shaped upper protrusions 86 may be of any appropriate design so long as the arcuately-shaped upper protrusions 86 cooperate with the arcuately-shaped upper protrusions 66 as at least one of the first and second cams 60, 80 rotates relative to the other about the axis 48. In at least one embodiment, the second cam stops 90 are longitudinally extending, disposed parallel to the axis 48. In at least one embodiment, the arcuately-shaped upper protrusions 86 present substantially flat upper surfaces 92. In at least one embodiment, the arcuately-shaped upper protrusions 86 are spaced from one another by a plurality of second cam gaps 94.

As the second cam 80 further includes a cylindrical base 96, which may include a cavity 98 within which the cam spring 108 may be at least partially disposed. The cylindrical base 96 may additionally include one or more engaging structures 100, which may engage with engaging structure (not visible) within the internal chamber 46 of the hinge base 28 to inhibit rotation. In the illustrated embodiment, the engaging structures 100 of the cylindrical base 96 include a plurality of longitudinally extending channels, while the engaging structures of the hinge base 28 include one or more radially extending protrusions disposed to engage the longitudinally extending channels.

The cam spring 108 is disposed to exert a biasing force, biasing the second cam 80 toward the first cam 60 in order to maintain contact between the ramped lower surfaces 68 of the first cam 60 and the ramped upper surfaces 88 of the second cam 80. It will be appreciated, however, that the first cam 60 could alternatively or additionally be biased toward the second cam 80.

Those of skill in the art will appreciate that the first cam 60 is rotatably disposed relative to the second cam 80. In the illustrated embodiment, the cap 54 is coupled for rotation with the top leaf 26 by the arcuate engagement flanges 58, the cap 54 further transmitting rotation to the first cam 60 by way of the driving protrusions 59. The first cam 60 rotates relative to the second cam 80, which is preventing from rotation relative to the hinge base 28 by way of the engaging structure 100. In this way, with the top leaf 26 coupled to the door 14 and the hinge base 28 coupled to the vehicle 10, the first cam 60 is disposed to rotate relative to the second cam 80 as the door 14 is opened or closed. In this way, as relative rotation occurs between the first and second cams 60, 80, the ramped lower surfaces 68 of the first cam 60 ride along the ramped upper surfaces 88 of the second cam 80. In the illustrated embodiment, as the door 14 is opened, the ramped lower surfaces 68 of the first cam 60 ride down the ramped upper surfaces 88 of the second cam 80, the second cam 80 being biased toward the first cam 60 by way of the cam spring 108. The first and second cams 60, 80 would progress toward each other axially until the relative positions of the first and second cam stops 70, 90 approach to arrest further relative rotation of the first and second cams 60, 80.

The internal components of the hinge assembly 16, that is, the top thrust bearing 50, bottom thrust bearing 52, cap 54, O-ring 104, first cam 60, second cam 80, cam spring 108, and washer 106, are axially disposed along axis 48 within the internal chambers 44, 46 of the top leaf 26 and hinge base 28, respectively. In order to maintain this alignment and to couple the components, a hinge pin 110 is provided. The hinge pin 110 includes a head 112 and a shaft 114 having a threaded distal end 116. The hinge pin 110 is disposed along the axis 48, the hinge pin 110 extending through the central openings in each of the internal components of the hinge assembly 16. In at least one embodiment, the distal end 116 of the hinge pin 110 extends through an axially extending opening 118 of the hinge base 28, as well as a seal 120, and locking washer 122 before being received in a locknut 124 dispose along the bottom of the hinge base 28.

In accordance with an aspect of this disclosure, an elastomeric bushing 130 is disposed between cap 54, which operates as a driving member, and the first cam 60, which operates as a driven member as the top leaf 26 rotates relative to the hinge base 28. Referring to FIG. 4, the elastomeric bushing 130 includes a disk 132, which includes a plurality of interruptions 134. The disk 132 includes a central bore 135 through which the hinge pin 110 may be extended. A plurality of lobes 136 extend from a lower surface of the disk 132 in a direction parallel to the central axis 48. The lobes 136 extend generally radially.

In assembly, the lobes 136 extend into to the recesses 76 of the first cam 60. In the illustrated embodiment, in order to conform to the interior of the arcuately-shaped lower protrusions 66, the lobes 136 alternate between relatively short lobes 138 and relatively long lobes 140 extending along opposite sides of the interruptions 134 in the disk 132 of the elastomeric bushing 130, that is, alternating around the disk 132. In this way, the long lobes 140 are disposed against the inside surface of the first cam stops 70 of the arcuately-shaped lower protrusions 66 of the first cam 60, while the short lobes 138 are disposed at the more shallow end of the arcuately-shaped lower protrusions 66. In the illustrated embodiment of the elastomeric bushing 130, the lobes 136 are of different thicknesses. That is, the long lobes 140 are relatively thick, and the short lobes 138 are relatively thin. In at least one embodiment, the distal ends of the lobes 136 are ramped to conform to the interior ramped surfaces of the arcuately-shaped lower protrusions 66. It will be appreciated, however, that the lobes 136 may be of an alternative configuration. For example, in at least some embodiments, the lobes 136 may all be of the same thickness, and in at least some embodiments, the lobes 136 may extend only along one side of the interruptions 134 in the disk 132.

In order to cushion the transmission of force between the cap 54 and the first cam 60, the driving protrusions 59 of the cap 54 are disposed in the interruptions 134 in the disk 132 of the elastomeric bushing 130. The lobes 136 of the elastomeric bushing 130 and the driving protrusions 59 of the cap 54 are disposed within the recesses 76 of the first cam upper side 62. That is, both the lobes 136 and the driving protrusions 59 are disposed within the arcuately-shaped lower protrusions 66 of the first cam 60 substantially adjacent the plurality of substantially radially extending walls 78 of the recesses 76 of the first cam 60. In this way, the lobes 140 cushion the confrontation of the driving protrusions 59 with plurality of substantially radially extending walls 78 of the arcuately-shaped lower protrusions 66 of the first cam 60 as the cap 54 rotates in a driving direction, as illustrated, a counter-clockwise direction, while the lobes 138 cushion the confrontation of the driving protrusions 66 with the other of the plurality of substantially radially extending walls 78 of the arcuately-shaped lower protrusions 66 as the cap 54 rotates in other than a driving direction, as illustrated, a clockwise direction.

As depicted herein, an embodiment has three driving protrusions 59, three arcuately-shaped lower protrusions 66, three arcuately-shaped upper protrusions 86, three short lobes 138, and three long lobes 140. Smaller and larger numbers of these components are contemplated. In at least some embodiments, these components sized such that there is minimal clearance between the driving protrusions 59 assembled into position between the short lobes 138 and long lobes 140 of the elastomeric bushing 130 disposed within the recesses 76 of the first cam upper side 62. In at least some embodiments, the assembly of the driving protrusions 59 between the short lobes 138 and long lobes 140 of the elastomeric bushing 130 into the recesses 76 of the first cam upper side 62 places one or both of the short lobes 138 and long lobes 140 in compression. In at least some embodiments, these components could be sized so as to include clearance space between one or more of the driving protrusions 59, the short lobes 138, the long lobes 140, and the recesses 76 of the first cam upper side 62, such that the short lobes 138 and long lobes 140 only come into contact with portions of the recesses 76 and/or the driving protrusions 59 at certain relative rotational positions between the top leaf 26 and hinge base 28. Although these components are shown as spaced symmetrically around axis 48, asymmetric configurations are also contemplated.

The elastomeric bushing 130 may be of any appropriate elastomeric composition that acts to cushion the driving movement. For example, the elastomeric bushing 130 may be formed of Hytrel®. The elastomeric bushing 130 may be formed by any appropriate fabrication method. By way of example only, injection, transfer, or compression molding may be appropriate for manufacturing the elastomeric bushing 130.

INDUSTRIAL APPLICABILITY

According to another aspect of this disclosure, the disposition of the elastomeric cushion 130 between driving member, here, the driving protrusions 59 of the cap 54, and the driven member of the hinge assembly 16, here, the interior recesses 76 of the arcuately-shaped lower protrusions 66 of the first cam 60, may have a cushioning effect, cushioning the impact during operation of the door 14.

In some embodiments, this cushioning effect may help to inhibit damage to the hinge assembly 16. In at least some embodiments, this may reduce downtime for repairs or replacement, and may reduce maintenance costs.

While the disclosed hinge and hinge assembly has been described with respect to vehicles having doors, the design may be applied to other machines having doors. Moreover, although it will be appreciated that the foregoing description provides useful examples of the particular designs of the components of the disclosed hinge and hinge assembly, it should be appreciated that other implementations of the disclosed principles will differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein.

I claim:

1. A hinge for pivotably coupling a first structure relative to a second structure, the hinge comprising:

a driving member, the driving member being configured for coupling to the first structure, a driven member, and an elastomeric bushing, the elastomeric bushing being disposed between the driving member and the driven member, said driving member, said driven member, and said elastomeric bushing being disposed along a central axis, wherein the elastomeric bushing includes an interrupted disk from which a plurality of lobes extend in a direction parallel to the central axis, said plurality of lobes being separated by a plurality of interruptions in said disk, and wherein the driven member includes a plurality of recesses, said plurality of lobes being disposed within said plurality of recesses.

2. The hinge of claim 1 wherein the plurality of lobes includes a plurality of thin lobes and a plurality of thick lobes wherein said thin lobes are thin relative to said thick lobes, said thick and thin lobes alternatingly extending about a periphery of the disk.

3. The hinge of claim 1 wherein the plurality of lobes includes a plurality of short lobes and a plurality of long lobes wherein said long lobes are long relative to said short lobes.

4. The hinge of claim 1 wherein the driving member includes a plurality of driving protrusions, said driving protrusions extending in a direction parallel to the central axis and being disposed within said plurality of interruptions in said disk.

5. The hinge of claim 1 wherein the driving member includes a plurality of driving protrusions, said driving protrusions extending in a direction parallel to the central axis and being disposed within said plurality of interruptions in said disk such that the plurality of lobes are disposed between the plurality of driving protrusions and the plurality of recesses.

6. The hinge of claim 5 wherein the driven member is a first cam, the plurality of recesses of the driven member being defined by generally arcuately-shaped lower protrusions including substantially radially extending walls defining the plurality of recesses such that the plurality of lobes are disposed between the plurality of driving protrusions and the substantially radially extending walls of the recesses of the arcuately-shaped lower protrusions, the arcuately-shaped lower protrusions including lower ramped-shaped surfaces.

7. The hinge of claim 6 further including a second cam including a plurality of upper ramped-shaped surfaces, the plurality of lower ramped-shaped surfaces of the first cam being disposed to ride on the plurality of upper ramped-shaped surfaces of the second cam.

8. A hinge assembly configured for pivotably coupling a door to a vehicle, the hinge assembly comprising:

a driving member configured to be coupled to said door, said driving member being configured for rotation about a central axis, the driving member including a plurality of driving protrusions, said driving protrusions extending in a direction parallel to the central axis, a first cam, the first cam having a first cam upper side and a first cam lower side, the first cam lower side including a plurality of arcuately-shaped lower protrusions having ramped lower surfaces and first cam stops, the first cam upper side defining a plurality of recesses extending within the plurality of arcuately-shaped lower protrusions, the plurality of recesses being at least partially defined by a plurality of substantially radially extending walls, a second cam, the second cam having a second cam upper side and a second cam lower side, the second cam upper side including a plurality of arcuately-shaped upper protrusions having ramped upper surfaces and second cam stops, said second cam being configured to be coupled to the vehicle, the first cam and the second cam being disposed along said central axis so that the ramped lower surfaces of the plurality of arcuately-shaped lower protrusions are configured to ride along the ramped upper surfaces of the plurality of arcuately-shaped upper protrusions as the first cam is driven to rotate relative to the second cam about said central axis, an elastomeric bushing disposed between the driving member and the first cam, the elastomeric bushing including an interrupted disk from which a plurality of lobes extend in a direction parallel to the central axis, at least a portion of the plurality of lobes being separated by a plurality of interruptions in said disk, the plurality of lobes extending in a generally radial direction parallel to the central axis, the plurality of lobes being disposed extending into at least a portion of the plurality of recesses of the arcuately-shaped lower protrusions of the first cam, the driving protrusions of the driving member extending into the plurality of interruptions in the elastomeric bushing and into the plurality of recesses of the plurality of arcuately-shaped lower protrusions of the first cam, such that the plurality of lobes are disposed between the driving protrusions and plurality of substantially radially extending walls of the plurality of recesses of the first cam.

9. The hinge assembly of claim 8 wherein the plurality of lobes includes a plurality of thin lobes and a plurality of thick lobes, wherein said thin lobes are thin relative to said thick lobes, said thick and thin lobes alternatingly extending about a periphery of the disk.

10. The hinge assembly of claim 8 wherein the plurality of lobes includes a plurality of short lobes and a plurality of long lobes, wherein said long lobes are longer relative to said short lobes.

11. The hinge assembly of claim 8 wherein the plurality of lobes disposed between the driving protrusions and the plurality of substantially radially extending walls of the recesses of first cam to cushion the engagement of the driving protrusions with the substantially radially extending walls when the driving member is rotated in a driving direction.

12. The hinge assembly of claim 11 wherein the lobes of the plurality of lobes are disposed between the driving protrusions and the plurality of radially extending walls of the recesses of the first cam such that the plurality of lobes cushion the engagement of the driving protrusion with the plurality of radially extending walls of the recesses of the first cam when the driving member is rotated in a direction other than the driving direction.

13. The hinge assembly of claim 8 wherein the driving member, the elastomeric bushing, the first cam and the second cam each include a respective bore along the central axis, and the hinge assembly further includes a hinge pin extending through said respective bores.

14. The hinge assembly of claim 8 further including a top leaf and a hinge base, the top leaf including an top leaf internal chamber and being configured for attachment to the door, the hinge base including a hinge base internal chamber and being configured for attachment to said vehicle, the driven member, the elastomeric bushing, the top cam, and said bottom cam being disposed within at least one of the top leaf internal chamber and the hinge base internal chamber.

15. The hinge assembly of claim 14 wherein the driving member, the elastomeric bushing, the first cam and the second cam each include a respective bore along the central axis, and the hinge assembly further includes a hinge pin extending through said respective bores, the hinge pin being coupled with the hinge base.

16. A vehicle comprising:

a vehicle body, a door, and a hinge assembly coupling the door to the vehicle body, the hinge assembly including:

a driving member coupled for rotation with said door, said driving member being configured for rotation about a central axis as the door is opened and closed, the driving member including a plurality of driving protrusions, said driving protrusions extending in a direction parallel to the central axis, a first cam, the first cam having a first cam upper side and a first cam lower side, the first cam lower side including a plurality of arcuately-shaped lower protrusions having ramped lower surfaces and first cam stops, the first cam upper side defining a plurality of recesses extending within the plurality of arcuately-shaped lower protrusions, the plurality of recesses including a plurality of substantially radially extending walls, a second cam coupled with the vehicle body, the second cam having a second cam upper side and a second cam lower side, the second cam upper side including a plurality of arcuately-shaped upper protrusions having ramped upper surfaces and second cam stops, the first cam and the second cam being disposed along said central axis so that the ramped lower surfaces of the plurality of arcuately-shaped lower protrusions of the first cam are configured to ride along the ramped upper surfaces of the plurality of arcuately-shaped upper protrusions of the second cam as the first cam is driven to rotate relative to the second cam about said axis, an elastomeric bushing disposed between the driving member and the first cam, the elastomeric bushing including an interrupted disk from which a plurality of lobes extend in a generally radial direction parallel to the central axis, said plurality of lobes being separated by a plurality of interruptions in said disk, the plurality of lobes being disposed within at least a portion of the plurality of recesses of the plurality of arcuately-shaped lower protrusions of the first cam, the driving protrusions of the driving member extending through the plurality of interruptions in the elastomeric bushing, such that the plurality of lobes are disposed between the driving protrusions and the substantially radially extending walls of the recesses of the first cam to cushion the engagement of the driving protrusions with the substantially radially extending walls of the recesses of the first cam when the driving member is rotated in a driving direction.

17. The vehicle of claim 16 wherein the plurality of lobes are disposed between the driving protrusions and the substantially radially extending walls of the recesses of the arcuately-shaped lower protrusions such that the plurality of lobes cushion the engagement of the driving protrusion with the substantially radially extending walls the first cam when the driving member is rotated in a direction other than the driving direction.

18. The vehicle of claim 16 further including a hinge pin, a top leaf and a hinge base, the top leaf including an top leaf internal chamber and being configured for attachment to the door, the hinge base including a hinge base internal chamber and being configured for attachment to said vehicle, the driven member, the elastomeric bushing, the top cam, and the bottom cam being disposed within at least one of the top leaf internal chamber and the hinge base internal chamber, and wherein the driving member, the elastomeric bushing, the first cam and the second cam each include a respective bore along the central axis, the hinge pin extending through said respective bores and being coupled with the hinge base.

* * * * *